United States Patent [19]

Schlick et al.

[11] 4,184,370

[45] Jan. 22, 1980

[54] LIQUID LEVEL MEASURING DEVICE

[76] Inventors: Horst Schlick, Pfingstbrunnenstr. 40, Schwalbach, Fed. Rep. of Germany, 6231; Karl Rau, Blumenstrasse 20, Mühlheim, Fed. Rep. of Germany, 6052

[21] Appl. No.: 938,479

[22] Filed: Aug. 31, 1978

[30] Foreign Application Priority Data

Sep. 9, 1977 [DE] Fed. Rep. of Germany ....... 2740653

[51] Int. Cl.² ...................... F04B 49/04; G01F 23/10
[52] U.S. Cl. ........................................ 73/313; 338/33; 417/41
[58] Field of Search .................... 73/317, 313, 308; 338/33; 200/84 B; 340/625; 137/398; 417/40, 41

[56] References Cited

U.S. PATENT DOCUMENTS

| | | | |
|---|---|---|---|
| 2,305,973 | 12/1942 | Marchment | 73/308 X |
| 2,927,174 | 3/1960 | Walshin | 200/84 B |
| 3,153,422 | 10/1964 | Marsee et al. | 73/317 X |
| 3,200,646 | 8/1965 | Donko et al. | 73/317 |
| 3,208,281 | 9/1965 | Kalmus et al. | 73/313 |
| 3,229,712 | 1/1966 | Perkins | 417/40 |
| 3,681,988 | 8/1972 | McNulty | 73/313 X |
| 3,925,747 | 12/1975 | Woodward et al. | 73/313 X |
| 3,935,741 | 2/1976 | Zinsmeyer et al. | 73/313 |

*Primary Examiner*—Daniel M. Yasich

[57] ABSTRACT

A liquid level measuring device for measuring the liquid level in a container, includes a fastening member for holding the device in a container, and a support with a lower end portion or prop extending into engagement with the container bottom. The support carries a liquid level sensing member and is connected to the fastening member through a resiliently yieldable connection, whereby the support is continuously urged into a constant position relative to the container bottom, so that an accurate indication is obtained of the liquid level in the container.

15 Claims, 4 Drawing Figures

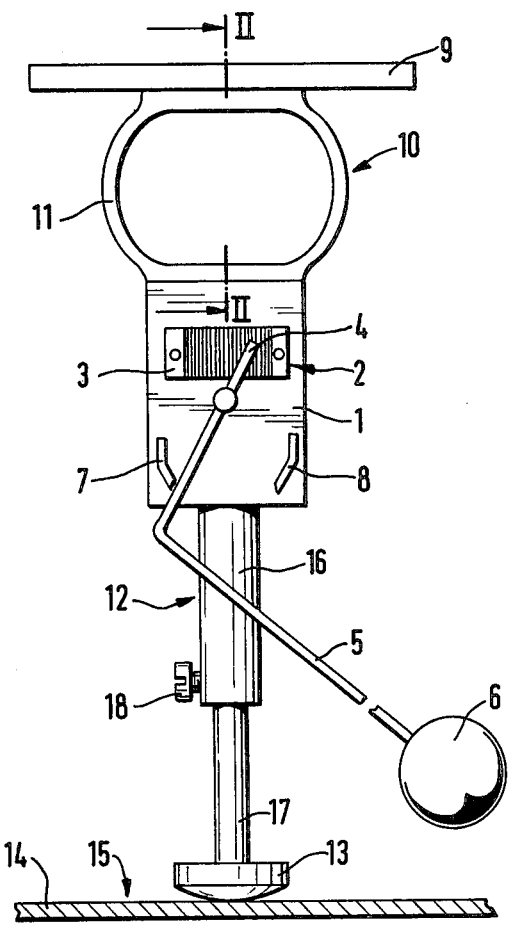
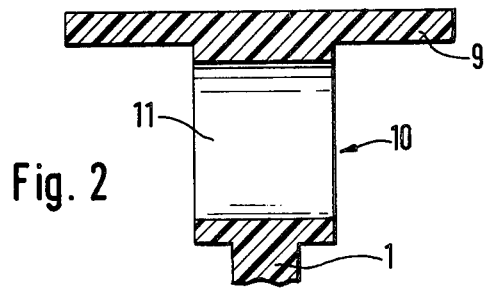

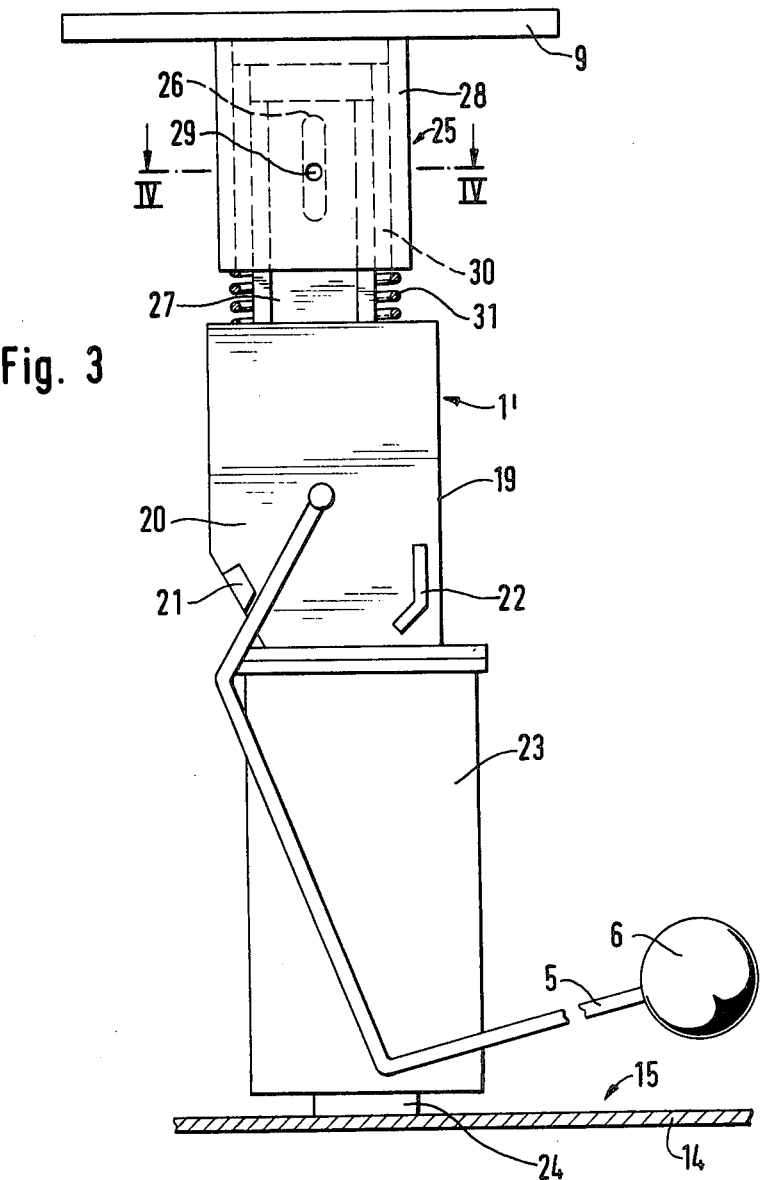

LIQUID LEVEL MEASURING DEVICE

BACKGROUND OF THE INVENTION

The invention relates to a liquid level measuring device provided with a support mounted on a holder for fastening the device to a container, on which support a liquid level detecting means, such as an electromechanical transducer, especially an adjustable resistor, is arranged, and including a lever bearing a float rotatably mounted on the support and acting upon said transducer.

In known liquid level measuring devices of this type, the support consists of a sheet metal casing within which the transducer is arranged and in which the lever with the float is mounted; or it may also consist of a plate of plastic material. For the purpose of setting the measuring device to the maximum and minimum liquid level values in the container, adjustable stops, for example, bendable metal flaps, are provided on the support which are brought, after the mounting of the liquid level measuring device, into the position prespecified for the container type involved.

Especially in flat containers of large caacity, it may happen that the container bottom, on account of the liquid weight acting thereon is, when the container is full, plastically deformed after the passage of time, and bulges downward, so that the liquid measuring device supported from the container ceiling indicates a smaller residual amount than is actually present. A further inaccuracy in the detection of the residual amount is caused by the usual thickness tolerances of the containers.

SUMMARY OF THE INVENTION

These shortcomings are eliminated by the invention, which provides a device that permits an exact residual amount detection in containers, including those with a large bottom area.

This problem is solved, according to the invention, by means of a structure wherein the support is mounted to the holder so as to be movable in vertical direction, and is provided at the side that faces away from the holder with a prop for supporting it on the container bottom.

Such a device achieves the result that the support with float and stops is always positioned at the same distance from the container bottom, and therefore, even when the distance between container ceiling and container bottom changes, be it on account of the manufacturing tolerances or be it on account of the elastic or plastic deformation of the bottom occurring while it is in use, the residual amount in the container and the residual amount indicated are in agreement.

According to a preferred embodiment of the invention, the support and the holder are connected by way of a resilient element comprising a ring-shaped element of small wall thickness which is diametrally engaged on opposite sides by the support and the holder. Such an element can be cheaply manufactured from plastic material and has few structural parts and is easy to assemble. In order to prevent a lateral deviation of the support with respect to the holder, the ring-shaped element may be made relatively wide and elliptical, the holder and support engaging at the sides of the ring corresponding to the small diameter of the ellipse. Additionally, to assist in the prevention of a lateral deviation of the support, it is desirable to provide the support with a disc-like base element.

For the purpose of adapting the liquid level measuring device to containers of different structures, and especially of different distances between container ceiling and container bottom, it is most practical that the prop consist of two or more mutually displaceable parts which can be locked in position.

The holder and the part of the coupling element or resilient element connected thereto form, according to an advantageous embodiment of the invention, a one-piece unit, and moreover, it is advisable to combine the support and the part of the coupling element, or the resilient element connected therewith as a one-piece unit. Finally, it may also be suitable to construct the support and the prop as a one-piece unit. By these measures, applied individually or in combination, the manufacturing costs of the liquid level measuring device are favorably affected. Particularly small manufacturing cost can be attained when the holder, the coupling element or the resilient element, the support and the prop consist of a thermo plastic material. In such a case all these parts of the liquid level measuring device can be manufactured in a single operation in an injection molding or pressing process.

According to another embodiment of the invention, the support is fastened by way of a coupling element or resilient element to the holder, which coupling element consists of a part provided with a slot and a sleeve-shaped part displaceably mounted thereon, wherein a pin passing through the slot is provided. Such a coupling element results in the advantage that even greater changes of the distance between the container ceiling, whereon the measuring device is fastened, and the container bottom can be absorbed satisfactorily without a lateral deviation of the support. It has proved practical, that the two parts be movable toward each other against the force of a spring. In this manner, the result is assured that even in the case of stronger shocks and vibrations the support with the holder is not lifted off the container bottom but remains in continuous contact therewith.

A further concept of the invention relates to a liquid level measuring device for a fuel tank of a motor vehicle with an electric motor-driven pump fastened to the measuring device. This arrangement is shown in the second embodiment of the invention. Such liquid level measuring devices with a flanged pump are used particularly in cases where the fuel must be conveyed over a longer path to the engine. This is the case especially in motor vehicles where the fuel tank is located in the rear and the engine in the front. In a development of the solution of the invention, the prop in these liquid level measuring devices can be advantageously substituted by the motor-driven pump. Besides the advantage that the prop can be completely eliminated, such a solution offers the advantage of a particularly compact and space-saving structure of the liquid level measuring device. Moreover, in many of the cases when a coupling element is used between the support and holder, a spring bracing the two coupling parts against each other can be dispensed with since the heavy weight of the motor-driven pump assures the result that the support is supported by the container bottom even at shocks and vibrations.

To prevent the running noises of the pump from spreading to the container and therefrom to the environment, it is advisable to provide the motor-driven pump, at least on the end facing away from the support, with a noise attenuation device engaged between the pump and the container bottom. For the same reason, it is advisable to provide in a liquid level measuring device with a support mounted via a coupling element to the holder, a further attenuation device between the motor-driven pump and the holder. This can be carried out advantageously in such a way that at least one of the two parts of the coupling element consists at least partly of an elastic material.

OBJECTS OF THE INVENTION

An object of the invention is to provide a liquid level measuring device which is continuously supported at a substantially constant position relative to the container bottom, for thereby obtaining an accurate indication of the liquid level in the container.

A further object is to provide a liquid level measuring device which includes noise attenuating means to isolate motor noises from the environment.

Another object of the invention is to provide a liquid level measuring device which includes a holder for fastening the device to the top of the container, a support on which is carried the liquid level detecting means, and a prop engaged against the container bottom for supporting the support relative to the container bottom, and further, wherein means is included for maintaining the prop in contact with the bottom.

An even further object of the invention is to provide a liquid level measuring device which includes a fastening element for fastening the device to the top of the container, a support on which a liquid level detecting means is carried, a resilient coupling element connected between the fastening element and the support, and prop means engaged against the container bottom, supporting the level detecting means relative to the bottom, and wherein the fastening element, support and at least a portion of the prop means are of one piece construction.

BRIEF DESCRIPTION OF THE DRAWINGS

The invention will be explained in greater detail with the aid of the drawings, which illustrate two embodiments in partly diagrammatical representation.

FIG. 1 shows a side view of a preferred form of liquid level measuring device with a resilient element between the support and holder;

FIG. 2 shows a section through the liquid level measuring device according to FIG. 1 along line II—II;

FIG. 3 shows a side view of a modified form of liquid level measuring device with a motor-driven pump; and FIG. 4 shows a section through the liquid level measuring device according to FIG. 3 along line IV—IV.

DESCRIPTION OF THE PREFERRED EMBODIMENT

The liquid level measuring device according to FIGS. 1 and 2 contains a support 1 of plastic material wherein a transducer such as an adjustable resistor 2 is provided and which consists of a resistance element 3 and a wiper 4. Wiper 4 is connected to a lever 5 which is rotatably mounted on support 1 and carries at its free end a float 6. For the purpose of limiting the angle of transverse of lever 5, two metallic flap-like stops 7 and 8 are provided on support 1, which stops can be suitably bent for adjustment.

A fastening element or holder comprising flange 9 is on one end of the device for fastening the device to the top or ceiling of a container, and is joined with a resiliently yieldable coupling means such as resilient element 10 which is shaped as a thin-walled elliptical ring 11. Support 1 and fastening flange 9 face each other diametrally of the ring 11 and form jointly with element 10 a one-piece unit of plastic material.

A prop 12 with a disc-like base element 13 molded thereon is on the end of support 1 facing away from fastening flange 9, by way of which support 1 is supported on the bottom 14 of the container 15 whose contents are to be detected. Prop 12 is subdivided into two sections 16 and 17, telescopically displaceable relative to each other, their relative position being secured by a setscrew 18. Further, as noted previously, the support and part or section 16 of the prop may be formed as a one-piece unit.

MODIFICATION

In the liquid level indicator according to FIGS. 3 and 4, the support 1' is shaped as a casing 19 of plastic material, wherein the adjustable resistor is provided and on which a lever 5 with float 6 is mounted. A fixed stop 21 is molded to the side wall 20 of casing 19, and a flap-like stop 22 which can be bent for the purpose of adjustment to the maximum liquid level is also provided on this side wall.

A motor-driven pump 23 is fixed to the end of casing 19 that faces away from fastening flange 9, and comprises the prop, by way of which motor-driven pump the liquid level measuring device can be supported by the bottom 14 of container 15. In order to prevent or dampen transmission of vibrations of motor-driven pump 23 to container 15, a noise attenuating means or base element 24 of elastic material is provided.

Casing 19 is connected via a resilient member or coupling element 25 with fastening flange 9. This coupling element consists of an inner part 27 provided with a slot 26 and forming a one-piece unit with casing 19, and a sleeve-like outer part 28 molded to the plastic material flange 9. The two parts are connected by a pin 29. An intermediate element or noise attenuating means 30 of an elastic material is provided between the two parts for the purpose of noise dampening. In order to assure a fully satisfactory abutment of the motor-driven pump with base element 24 against container bottom 14, a spring 31 is provided in the coupling element, against whose force both parts 27 and 28 are displaceable relative to each other.

What is claimed is:

1. A liquid level measuring device for use inside containers having different sizes and shapes, comprising:
   a holder for fastening the device to the top of a container;
   a support mounted on the holder and extending toward the bottom of the container;
   an electro-mechanical transducer mounted on the support;
   a lever rotatably mounted on the support and carrying a float for moving the lever as the liquid level changes, said lever acting upon the transducer in response to changes in the liquid level;
   prop means connected with the support in generally axial alignment therewith for extending into contact with the container bottom for supporting the support relative to the container bottom;
   resiliently yieldable coupling means connecting the support to the holder to compensate for dimensional changes between the top and bottom of the container and maintaining the prop in engagement with the container bottom so that the support is maintained in a constant predetermined spaced relation to the container bottom; and adjustble means for adjusting the length of the device to accommodate it to different size containers.

2. In combination, a liquid level measuring device and pump, comprising:

a holder for fastening the device inside a container in spaced relation to a bottom of the container;

a support mounted on the holder;

an electro-mechanical transducer mounted on the support;

a lever rotatably mounted on the support and carrying a float for moving the lever as the liquid level changes, said lever acting upon the transducer in response to changes in the liquid level;

prop means connected with the support for extending into contact with the container bottom for supporting the support relative to the container bottom, said prop means comprising a motor-driven pump means driven by conventional means for pumping liquid from the container; and resiliently yieldable coupling means connecting the support to the holder so that the support is movable in a longitudinal direction relative to the holder to compensate for dimensional changes between the top and bottom of the container to maintain the support in a constant predetermined spaced relation to the container bottom.

3. In a liquid level measuring device comprising a holder for fastening the device to the inside top of a container in spaced relation to a bottom of the container, a support mounted on the holder, an electro-mechanical transducer mounted on the support, and a lever rotatably mounted on the support and carrying a float for moving the lever as the liquid level changes, said lever acting upon the transducer in response to changes in the liquid level, the improvement comprising:

prop means connected with the support for extending into contact with the inside bottom of the container for supporting the support relative to the container bottom, the support and prop means being in general vertical alignment with one another; and resiliently yieldable coupling means connecting the support to the holder so that the support is movable in a longitudinal direction relative to the holder to compensate for dimensional changes between the top and bottom of the container and maintain the support in a constant predetermined spaced relation to the container bottom.

4. A liquid level measuring device as claimed in claim 3, wherein the coupling means comprises:

a first part provided with a slot;

a sleeve-like part displaceably arranged on said first part;

a pin passing through the slot; and a spring engaged between the two parts, urging them longitudinally apart with respect to each other.

5. Liquid level measuring device as claimed in claim 3, wherein the coupling means comprises a ring-shaped element of small wall thickness which is diametrally engaged by the support on one side and the holder on the other side.

6. Liquid level measuring device as claimed in claim 5, wherein the support is provided with a disc-like base element.

7. Liquid level measuring device as claimed in claim 3, wherein the prop means has two mutually displaceable and lockable parts.

8. Liquid level measuring device as claimed in claim 3, wherein the holder and the coupling means connected therewith form a one-piece unit.

9. Liquid level measuring device as claimed in claim 8, wherein the support and the coupling means form a one-piece unit.

10. Liquid level measuring device as claimed in claim 9, wherein the support and the prop means supporting the support on the container bottom form a one-piece unit.

11. Liquid level measuring device as claimed in claim 10, wherein the holder, the coupling means, the support and the means supporting the prop support on the container bottom comprise a thermoplastic material.

12. Liquid level mesuring device as claimed in claim 3, wherein the prop means comprises a motor-driven fuel pump driven by conventional means for pumping fuel from the container to an engine of a vehicle.

13. Liquid level measuring device as claimed in claim 12, wherein the motor-driven pump is provided, at least at the end facing away from the support, with a noise attenuation element by way of which it is supported by the container bottom.

14. Liquid level measuring device as claimed in claim 13, wherein a noise attenuation element is provided between the motor-driven pump and the holder.

15. Liquid level measuring device as claimed in claim 3, wherein the prop means comprises a motor-driven fuel pump driven by conventional means for pumping fuel from the container to an engine of a vehicle, and at least one of the two parts of the coupling means comprises at least partially an elastic material for attenuating noise.

* * * * *